United States Patent [19]

Roth et al.

[11] Patent Number: 4,757,914

[45] Date of Patent: Jul. 19, 1988

[54] LAMINATED CLOSURE FOR A PLASTIC CONTAINER

[75] Inventors: Donald J. Roth, Westport; Ihab M. Hekal, Stamford, both of Conn.

[73] Assignee: Continental Can Company, Inc., Norwalk, Conn.

[21] Appl. No.: 7,185

[22] Filed: Jan. 27, 1987

[51] Int. Cl.$^4$ .............................................. B65D 17/34
[52] U.S. Cl. .................................... 220/359; 220/270; 215/232
[58] Field of Search ................ 220/359, 270; 215/232; 156/273.9, 275.1

[56] References Cited

U.S. PATENT DOCUMENTS

| | | | |
|---|---|---|---|
| 4,024,008 | 5/1977 | Gregornik et al. | 156/272.4 |
| 4,171,084 | 10/1979 | Smith | 220/359 |
| 4,244,369 | 1/1981 | McAvinn et al. | 604/362 |
| 4,253,901 | 3/1981 | Aslakson | 156/327 |
| 4,513,876 | 4/1985 | Buchner | 220/270 |
| 4,533,063 | 8/1985 | Buchner et al. | 220/270 |
| 4,545,842 | 10/1985 | Parsons | 156/310 |

Primary Examiner—Jimmy G. Foster
Assistant Examiner—Nova Stucker
Attorney, Agent, or Firm—Charles E. Brown

[57] ABSTRACT

This relates to a closure for a plastic container wherein the closure is to be heat bonded to the container. The closure is of a laminated construction and includes an outer structural layer of plastic material, a combined electric heat inductive and barrier layer, and an inner bond forming plastic material layer. The bond forming inner layer is thin as compared to the thickness of the structural outer layer. The barrier layer is formed of a metal foil, preferably aluminum, and is also quite thin.

6 Claims, 1 Drawing Sheet

LAMINATED CLOSURE FOR A PLASTIC CONTAINER

This invention relates in general to new and useful improvements in plastic containers, and more particularly to a laminated cover for such containers.

The invention particularly relates to the retort packaging of products within plastic containers. More particularly, the invention relates to a closure which may be readily bonded to a plastic container and wherein the closure may be removed from the plastic container by progressively rupturing the bond between the closure and the container.

In the retort packaging of products within a container, it is necessary that the container be filled and closed and that the seal between the closure and the container be absolute and capable of withstanding retort environment. Further, it is necessary from a commercial standpoint that the bond between the closure and the container be immediately effective. While many types of securement have been considered, it has been found that the most practical securement of the closure to the container is by way of a heat formed bond between plastic layers of the closure and the container.

In accordance with this invention, the closure which is the subject of the invention, is provided with a barrier layer which also has electrical inductive characteristics. Most particularly, the barrier layer of the closure is in the form of a metal foil with aluminum being the preferred metal.

The laminated closure in accordance with this invention preferably includes a structural outer layer to which there is bonded the aluminum foil barrier layer. In turn, the aluminum foil barrier layer has bonded thereto a very thin plastic material inner layer which is suitable for heat bonding to an outer layer of a container which is to be closed by the closure.

With the above and other objects in view that will hereinafter appear, the nature of the invention will be more clearly understood by reference to the following detailed description, the appended claims, and the several views illustrated in the accompanying drawing.

Figure 1:
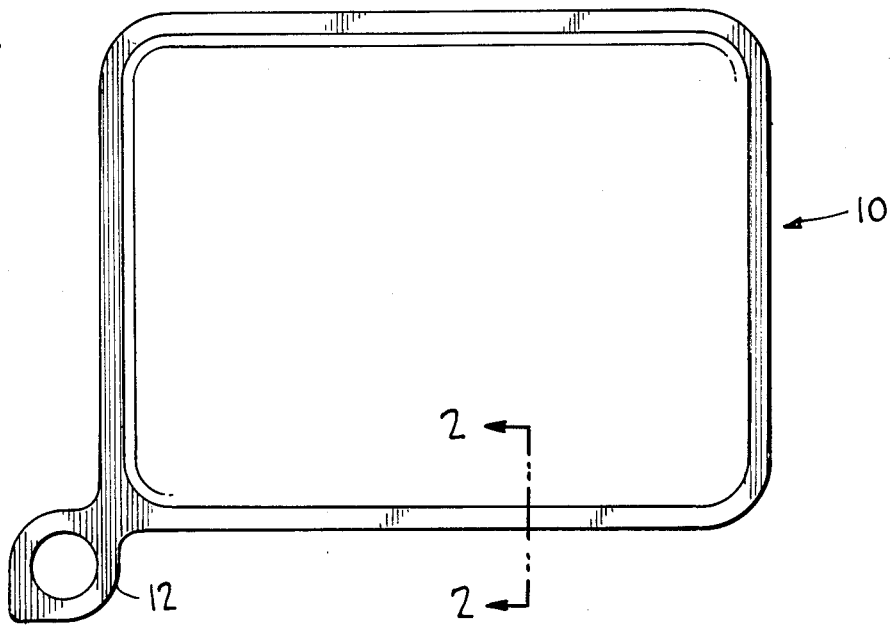
FIG. 1 is a plan view of a typical closure in accordance with this invention, the illustrated closure being intended for use in conjunction with a rectangular outline container.

Referring now to the drawings in detail, it will be seen that there is illustrated in FIG. 1 a closure formed in accordance with the invention. The closure is generally identified by the numeral 10 and is rectangular in outline for closing a container which is also rectangular in outline. At this time it is pointed out that if the container was circular in outline, for example, then the closure 10 would be circular in outline.

It is to be understood that the closure 10 is to be heat bonded to a container. In order that the closure 10 may be removed from the container when it is desired to open the container, the closure 10 has projecting from one corner thereof a pull tab 12.

Figure 2:
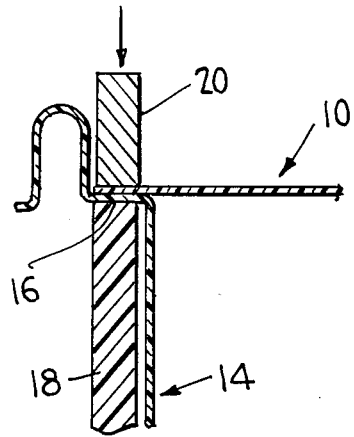
FIG. 2 is an enlarged fragmentary sectional view taken generally along the line 2—2 of FIG. 1 and shows the manner in which the closure is heat bonded to a container utilizing an inductive heating coil.

Reference is now made to FIG. 2 wherein there is illustrated the manner in which the closure 10 is applied to a container, the container being generally identified by the numeral 14. The container 14 is of a molded plastic material construction and includes a support flange 16 which extends entirely around the mouth of the container 14 and to which is to be heat bonded the closure 10.

In practice, the support flange 16 of the filled container 14 is supported by a nest 18. The closure 10 is positioned in overlying relation to the support flange 16 and a peripheral edge portion of the closure 10 is compressively engaged by an induction heating coil 20.

Figure 3:
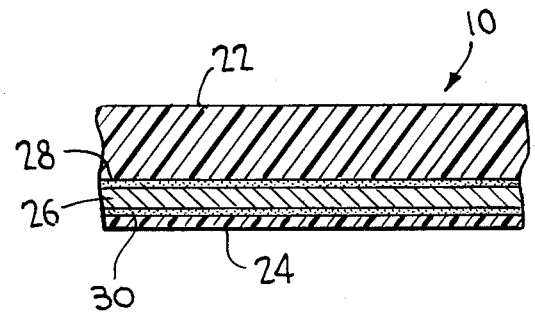
FIG. 3 is an enlarged fragmentary sectional view taken through the closure showing the specifics of the laminations thereof.

Referring now to FIG. 3, it will be seen that there is illustrated the construction of the closure 10 which is of a laminated construction. The closure 10 includes a structural outer layer 22 which is formed of a suitable plastic material such as polypropylene. The closure 10 also includes an inner bond forming layer 24 which is also formed of a plastic material such as polypropylene.

Sandwiched between the layers 22 and 24 is a combined electric heat inductive and barrier layer 26. The layer 26 is preferably formed of aluminum foil.

The layer 26 is adhesively bonded to the structural outer layer 22 by an adhesive layer 28. A similar adhesive layer 30 bonds the inner layer 24 to the layer 26. The adhesive which forms the adhesive layers 28 and 30 is a conventional thermoplastic adhesive and melts during the bonding of the closure 10 to the container 14 and immediately thereafter resolidifies and maintains the adhesions between the various layers so as to withstand the heat electrically induced into the periphery of the layer 26.

As stated above, the outer layer 22 is a structural layer. It must be of sufficient toughness to withstand the rigors of the closure being peeled from the container by a progressive rupture of the heat formed bond between the layer 24 and the container 14 utilizing the pull tab 12. In accordance with the invention, it has a thickness on the order of 22 mils. On the other hand, the inner layer 24 is very thin as compared to the outer layer 22 and has a thickness on the order of 1 mil.

It is to be understood that the aluminum foil layer 26 should be as thin as possible for economical purposes. On the other hand, it must be sufficiently thick to have induced therein sufficient heat to melt the layer 24 and also the upper surface of the container 14 to provide the required heat seal between the closure 10 and the container 14. It has been found that a thickness on the order 0.0018 inch is most economical.

Although only a preferred embodiment of the closure has been specifically illustrated and described herein, it is to be understood that minor variations may be made in the closure construction and thickness of layers without departing from the spirit and scope of the invention as defined by the appended claims.

What is claimed as new is:

1. A closure for a plastic container, said closure being of an outline for matching an intended container and being of a laminated construction, said closure including an outer structural layer of plastic material, an intermediate layer forming combined electric heat inductive means and barrier means, and an inner bond forming plastic material layer, said intermediate layer being formed of aluminum foil having a thickness on the order of 0.0018 inch, and said bond forming layer having a thickness on the order of 1 mil.

2. A closure according to claim 1 wherein said bond forming inner layer is thin as compared to the thickness of said structural outer layer.

3. A closure according to claim 1 wherein the thickness of said structural outer layer is on the order of 22 mils.

4. A closure according to claim 1 wherein both said outer layer and said inner layer are formed of polypropylene.

5. A closure according to claim 1 wherein said intermediate layer is bonded to said inner layer and said outer layer by heat resistant adhesive.

6. A closure according to claim 1 wherein said closure carries a projecting pull tab for effecting a progressive rupture of a resulting heat formed bond between said bond forming inner layer and an associated container.

* * * * *